United States Patent
Garudadri et al.

(10) Patent No.: US 7,941,313 B2
(45) Date of Patent: May 10, 2011

(54) SYSTEM AND METHOD FOR TRANSMITTING SPEECH ACTIVITY INFORMATION AHEAD OF SPEECH FEATURES IN A DISTRIBUTED VOICE RECOGNITION SYSTEM

(75) Inventors: Harinath Garudadri, San Diego, CA (US); Michael Stuart Phillips, Belmont, MA (US)

(73) Assignee: QUALCOMM Incorporated, San Diego, CA (US)

( * ) Notice: Subject to any disclaimer, the term of this patent is extended or adjusted under 35 U.S.C. 154(b) by 965 days.

(21) Appl. No.: 10/017,375

(22) Filed: Dec. 14, 2001

(65) Prior Publication Data
US 2003/0061036 A1 Mar. 27, 2003

Related U.S. Application Data

(60) Provisional application No. 60/292,043, filed on May 17, 2001, provisional application No. 60/298,502, filed on Jun. 14, 2001.

(51) Int. Cl.
*G10L 11/04* (2006.01)
(52) U.S. Cl. .................................. 704/208
(58) Field of Classification Search .......... 704/201, 704/208, 214; 379/88.01; 455/563
See application file for complete search history.

(56) References Cited

U.S. PATENT DOCUMENTS

| | | | |
|---|---|---|---|
| 4,672,669 A * | 6/1987 | DesBlache et al. | 704/237 |
| 4,905,234 A * | 2/1990 | Childress et al. | 370/349 |
| 5,054,042 A * | 10/1991 | Soury et al. | 455/557 |
| 5,450,522 A | 9/1995 | Hermansky et al. | |
| 5,553,190 A | 9/1996 | Ohya et al. | |
| 5,572,623 A * | 11/1996 | Pastor | 704/233 |
| 5,619,493 A * | 4/1997 | Ritz et al. | 370/330 |
| 5,633,873 A * | 5/1997 | Kay et al. | 370/336 |
| 5,642,519 A * | 6/1997 | Martin | 704/9 |
| 5,703,881 A * | 12/1997 | Kay et al. | 370/468 |
| 5,737,358 A * | 4/1998 | Ritz et al. | 375/133 |
| 5,742,930 A | 4/1998 | Howitt | |
| 5,758,256 A * | 5/1998 | Berry et al. | 455/72 |
| 5,855,003 A * | 12/1998 | Ladden et al. | 704/270 |
| 5,878,118 A | 3/1999 | Mohr | |
| 5,953,698 A | 9/1999 | Hayata | |

(Continued)

FOREIGN PATENT DOCUMENTS
EP 0067721 12/1982
(Continued)

OTHER PUBLICATIONS

Bentelli et al, "A Multichannel speech/silence detector based on time delay estimation and fuzzy classification", ICASSP 1999 Proceedings, Mar. 15-19, 1999; vol. 1 pp. 93-96.*

(Continued)

*Primary Examiner* — Michael N Opsasnick
(74) *Attorney, Agent, or Firm* — Albert J. Harnois, Jr.; Espartaco Diaz Hidalgo

(57) ABSTRACT

A system and method for transmitting speech activity in a distributed voice recognition system. The distributed voice recognition system includes a local VR engine in a subscriber unit and a server VR engine on a server. The local VR engine comprises a feature extraction (FE) module that extracts features from a speech signal, and a voice activity detection module (VAD) that detects voice activity within a speech signal. Indications of voice activity are transmitted ahead of features from the subscriber unit to the server.

30 Claims, 7 Drawing Sheets

U.S. PATENT DOCUMENTS

| | | | |
|---|---|---|---|
| 5,956,683 | A | 9/1999 | Jacobs et al. |
| 5,960,399 | A | 9/1999 | Barclay et al. |
| 6,076,058 | A * | 6/2000 | Chengalvarayan ........ 704/256.8 |
| 6,078,886 | A | 6/2000 | Dragosh et al. |
| 6,092,039 | A | 7/2000 | Zingher |
| 6,108,539 | A * | 8/2000 | Ray et al. ...................... 455/430 |
| 6,157,836 | A * | 12/2000 | Cashman ...................... 455/436 |
| 6,157,909 | A * | 12/2000 | Mauuary et al. .............. 704/228 |
| 6,182,032 | B1 * | 1/2001 | Rapeli ............................ 704/214 |
| 6,195,636 | B1 | 2/2001 | Crupi et al. |
| 6,243,739 | B1 | 6/2001 | Schwartz et al. |
| 6,259,916 | B1 * | 7/2001 | Bourk et al. .................... 455/434 |
| 6,275,800 | B1 | 8/2001 | Chevalier et al. |
| 6,366,886 | B1 * | 4/2002 | Dragosh et al. ............ 704/270.1 |
| 6,370,135 | B1 * | 4/2002 | Gardner ........................ 370/352 |
| 6,408,180 | B1 * | 6/2002 | McKenna et al. ............. 455/431 |
| 6,415,253 | B1 * | 7/2002 | Johnson ........................ 704/210 |
| 6,427,134 | B1 * | 7/2002 | Garner et al. .................. 704/233 |
| 6,442,155 | B1 * | 8/2002 | Suk et al. ....................... 370/342 |
| 6,519,260 | B1 * | 2/2003 | Galyas et al. ............ 370/395.42 |
| 6,577,862 | B1 | 6/2003 | Davidson et al. |
| 6,581,032 | B1 * | 6/2003 | Gao et al. ....................... 704/222 |
| 6,633,839 | B2 * | 10/2003 | Kushner et al. ............... 704/205 |
| 6,671,669 | B1 | 12/2003 | Garudadri et al. |
| 6,678,654 | B2 * | 1/2004 | Zinser et al. ................... 704/221 |
| 6,681,207 | B2 | 1/2004 | Garudadri |
| 6,694,294 | B1 | 2/2004 | Garudadri |
| 6,697,776 | B1 | 2/2004 | Fayad et al. |
| 6,707,821 | B1 * | 3/2004 | Shaffer et al. ............... 370/395.4 |
| 6,721,698 | B1 * | 4/2004 | Hariharan et al. ............. 704/203 |
| 6,738,457 | B1 * | 5/2004 | Pickering et al. .......... 379/88.16 |
| 6,754,629 | B1 | 6/2004 | Qi et al. |
| 6,782,361 | B1 | 8/2004 | El-Maleh et al. |
| 6,791,944 | B1 | 9/2004 | Demetrescu et al. |
| 6,803,964 | B1 | 10/2004 | Post et al. |
| 6,813,606 | B2 | 11/2004 | Ueyama et al. |
| 6,823,306 | B2 | 11/2004 | Reding et al. |
| 6,850,774 | B1 * | 2/2005 | Cashman ................... 455/553.1 |
| 6,868,385 | B1 | 3/2005 | Gerson |
| 6,885,735 | B2 | 4/2005 | Odinak et al. |
| 6,901,362 | B1 | 5/2005 | Jiang et al. |
| 7,016,833 | B2 | 3/2006 | Gable et al. |
| 7,203,643 | B2 * | 4/2007 | Garudadri ...................... 704/233 |
| 7,440,891 | B1 * | 10/2008 | Shozakai et al. .............. 704/233 |
| 2001/0001866 | A1 | 5/2001 | Kikinis |
| 2002/0091515 | A1 | 7/2002 | Garudadri |
| 2002/0116186 | A1 * | 8/2002 | Strauss et al. ................. 704/233 |
| 2003/0004712 | A1 | 1/2003 | Erell |
| 2003/0046711 | A1 | 3/2003 | Cui et al. |
| 2003/0125955 | A1 | 7/2003 | Arnold et al. |
| 2003/0139930 | A1 | 7/2003 | He et al. |
| 2003/0182113 | A1 | 9/2003 | Huang |
| 2005/0119896 | A1 | 6/2005 | Bennett et al. |

FOREIGN PATENT DOCUMENTS

| | | |
|---|---|---|
| EP | 0671721 | 9/1995 |
| JP | 05122165 | 5/1993 |
| JP | 07036497 | 2/1995 |
| JP | 09218694 | 8/1997 |
| JP | 10039898 | 2/1998 |
| WO | 02061727 | 8/2002 |

OTHER PUBLICATIONS

Beritelli et al, "A robust voice activity detector for wireless commuinications using soft computing", IEEE Journal on Selected Areas in Communication, Dec. 1998, vol. 16, Issue 9, pp. 1818-1829.*

Maleh et al, "Comparison of voice activity detection algorithms for wireless personal communication systems", IEEE 1997 Canadian Conference on Electrical and Computer Engineering, May 25-28, 1997, vol. 2 pp. 470-473 vol. 2.*

Reichl, W., et al. (2000) A codec for speech recognition in a wireless system. IEEE pp. 34-37.

International Preliminary Examination Report—PCT/US02/015581, IPEA/US—Aug. 5, 2003.

International Search Report—PCT/US02/015581, International Search Authority—European Patent Office—Sep. 4, 2002.

"The Performance Evaluation of Distributed Speech Recognition for Chinese Digits," by Zhao et al., Proceedings of the 17th International Conference on AINA '03, Mar. 27-29, 2003, pp. 151-154.

* cited by examiner

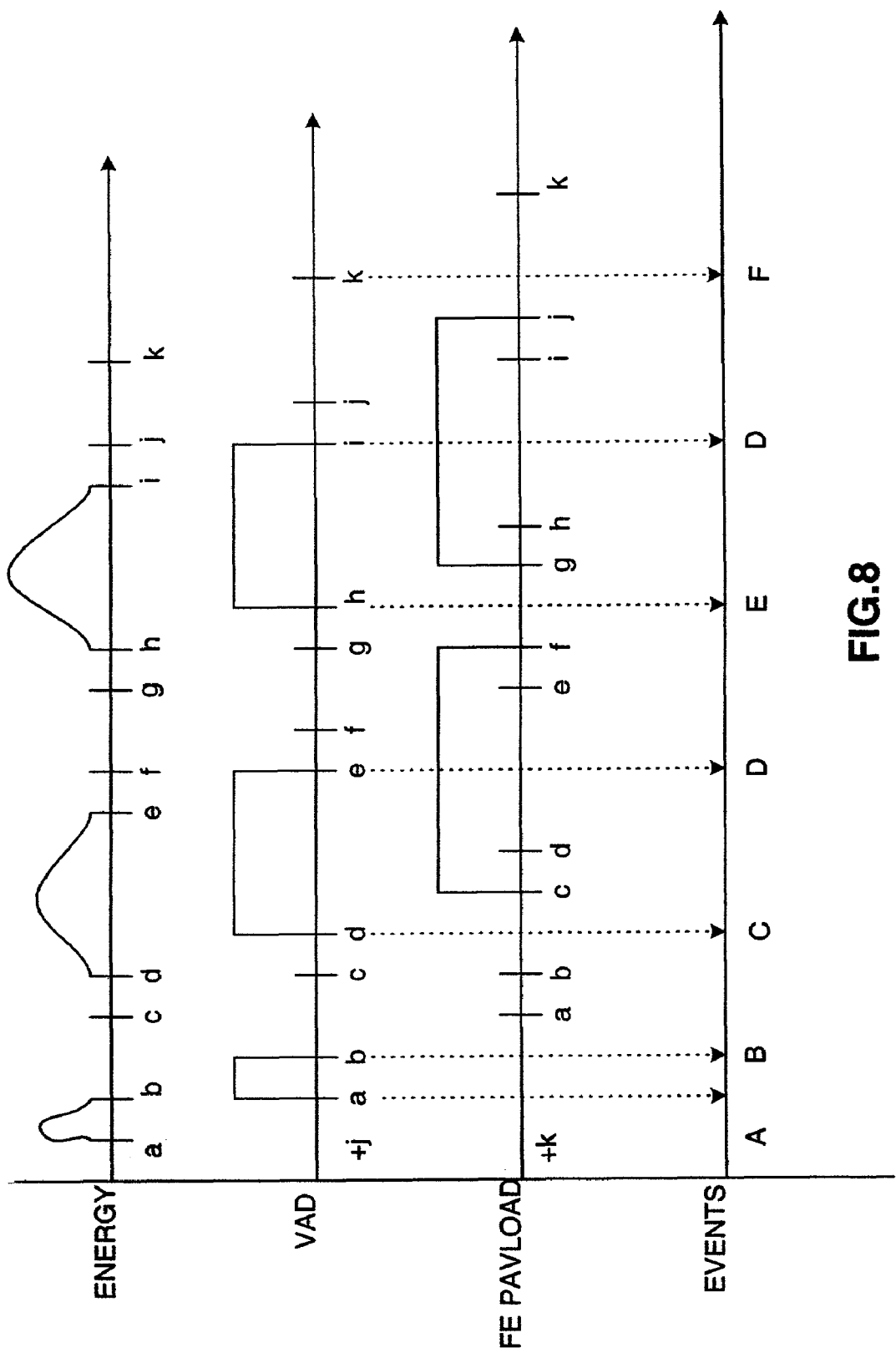

SYSTEM AND METHOD FOR TRANSMITTING SPEECH ACTIVITY INFORMATION AHEAD OF SPEECH FEATURES IN A DISTRIBUTED VOICE RECOGNITION SYSTEM

CLAIM OF PRIORITY UNDER 35 U.S.C. §120

This application claims priority to Provisional Application No. 60/292,043, filed May 17, 2001, entitled "Method for Reducing Response Time in Distributed Voice Recognition Systems" and Provisional Application No. 60/298,502, filed Jun. 14, 2001, entitled "Method and Apparatus for Transmitting Speech Activity in Distributed Voice Recognition System" both currently assigned to the assignee of the present application.

BACKGROUND

I. Field

The present invention pertains generally to the field of communications and more specifically to a system and method for transmitting speech activity in a distributed voice recognition system.

II. Background

Voice recognition (VR) represents one of the most important techniques to endow a machine with simulated intelligence to recognize user-voiced commands and to facilitate a human interface with the machine. VR also represents a key technique for human speech understanding. Systems that employ techniques to recover a linguistic message from an acoustic speech signal are called voice recognizers.

The use of VR (also commonly referred to as speech recognition) is becoming increasingly important for safety reasons. For example, VR may be used to replace the manual task of pushing buttons on a wireless telephone keypad. This is especially important when a user is initiating a telephone call while driving a car. When using a car telephone without VR, the driver must remove one hand from the steering wheel and look at the phone keypad while pushing the buttons to dial the call. These acts increase the likelihood of a car accident. A speech-enabled car telephone (i.e., a telephone designed for speech recognition) allows the driver to place telephone calls while continuously watching the road. In addition, a hands-free car-kit system would permit the driver to maintain both hands on the steering wheel during initiation of a telephone call. An exemplary vocabulary for a hands-free car kit might include the ten digits; the keywords "call," "send," "dial," "cancel," "clear," "add," "delete," "history," "program," "yes," and "no"; and the names of a predefined number of commonly called coworkers, friends, or family members.

A voice recognizer, i.e., a VR system, comprises an acoustic processor, also called the front-end of a voice recognizer, and a word decoder, also called the backend of a voice recognizer. The acoustic processor performs feature extraction. The acoustic processor extracts a sequence of information-bearing features (vectors) necessary for VR from the incoming raw speech. The word decoder decodes this sequence of features (vectors) to yield the meaningful and desired format of output, such as a sequence of linguistic words corresponding to the input utterance.

In a voice recognizer implementation using a distributed system architecture, it is often desirable to place the word-decoding task at the subsystem that can absorb the computational and memory load appropriately—at a network server. Whereas, the acoustic processor should reside as close to the speech source as possible to reduce the effects of vocoders (used for compressing speech prior to transmission) introduced by signal processing and/or channel induced errors—at a user device. Thus, in a Distributed Voice Recognition (DVR) system, the acoustic processor resides within the user device and the word decoder resides on a network.

DVR systems enable devices such as cell phones, personal communications devices, personal digital assistants (PDAs), etc., to access information and services from a wireless network, such as the Internet, using spoken commands, by accessing voice recognition servers on the network.

Air interface methods degrade accuracy of voice recognition systems in wireless applications. This degradation can be mitigated by extracting VR features from a user's spoken commands on a device, such as a subscriber unit (also called a subscriber station, mobile station, mobile, remote station, remote terminal, access terminal, and user equipment), and transmitting the VR features in data traffic, instead of transmitting spoken commands in voice traffic.

Thus, in a DVR system, front-end features are extracted in the device and sent to the network. A device may be mobile or stationary, and may communicate with one or more base stations (BSs) (also called cellular base stations, cell base stations, base transceiver systems (BTSs), base station transceivers, central communication centers, access points, access nodes, Node Bs, and modem pool transceivers (MPTs)).

Complex voice recognition tasks require significant computational resources. It is not practical to implement such systems on a subscriber unit with limited CPU, memory and battery resources. DVR systems leverage the computational resources available on the network. In a typical DVR system, the word decoder has more computational and memory requirements than the front-end of the voice recognizer. Thus, a server-based VR system within the network serves as the backend of the voice recognition system and performs word decoding. This has the benefit of performing complex VR tasks using the resources on the network. Examples of DVR systems are disclosed in U.S. Pat. No. 5,956,683, entitled "Distributed Voice Recognition System," assigned to the assignee of the present invention and incorporated by reference herein.

In addition to feature extraction being performed on the subscriber unit, simple VR tasks can be performed on the subscriber unit, in which case the VR system on the network is not used for simple VR tasks. Consequently, network traffic is reduced with the result that the cost of providing speech-enabled services is reduced.

Notwithstanding the subscriber unit performing simple VR tasks, traffic congestion on the network can result in subscriber units obtaining poor service from the server-based VR system. A distributed VR system enables rich user interface features using complex VR tasks, but at the price of increasing network traffic and sometimes delay. If a local VR engine on the subscriber unit does not recognize a user's spoken commands, then the user's spoken commands have to be transmitted to the server-based VR engine after front-end processing, thereby increasing network traffic and network congestion. Network congestion occurs when a large quantity of network traffic is being transmitted at the same time from the subscriber unit to the server-based VR system. After the spoken commands are interpreted by a network-based VR engine, the results have to be transmitted back to the subscriber unit, which can introduce a significant delay if there is network congestion.

Thus, in a DVR system, there is a need for a system and method to reduce network congestion and to reduce delay. A system and method that reduces network congestion and reduces delay would improve VR performance.

SUMMARY

The described embodiments are directed to a system and method for transmitting speech activity to reduce network congestion and delay. A system and method for transmitting speech activity voice recognition includes a Voice Activity Detection (VAD) module and a Feature Extraction (FE) module on the subscriber unit.

In one aspect, a subscriber unit comprises a feature extraction module configured to extract a plurality of features of a speech signal, a voice activity detection module configured to detect voice activity within the speech signal and provides an indication of the detected voice activity, and a transmitter coupled to the feature extraction module and the voice activity detection module and configured to transmit the indication of detected voice activity ahead of the plurality of features.

In another aspect, a subscriber unit comprises a means to extract a plurality of features of a speech signal, a means to detect voice activity within the speech signal and provides an indication of the detected voice activity, and a transmitter coupled to the feature extraction means and the voice activity detection means and configured to transmit the indication of detected voice activity ahead of the plurality of features.

In one aspect, the subscriber unit further comprises a means for combining the plurality of features with the indication of detected voice activity, wherein the indication of detected voice activity is ahead of the plurality of features.

In one aspect, a method of transmitting speech activity comprises extracting a plurality of features of a speech signal, detecting voice activity with the speech signal and providing an indication of the detected voice activity, and transmitting the indication of detected voice activity ahead of the plurality of features.

BRIEF DESCRIPTION OF THE DRAWINGS

FIG. 8 shows parts of speech and VAD events on a timeline in accordance with one embodiment.

DETAILED DESCRIPTION

Figure 1:
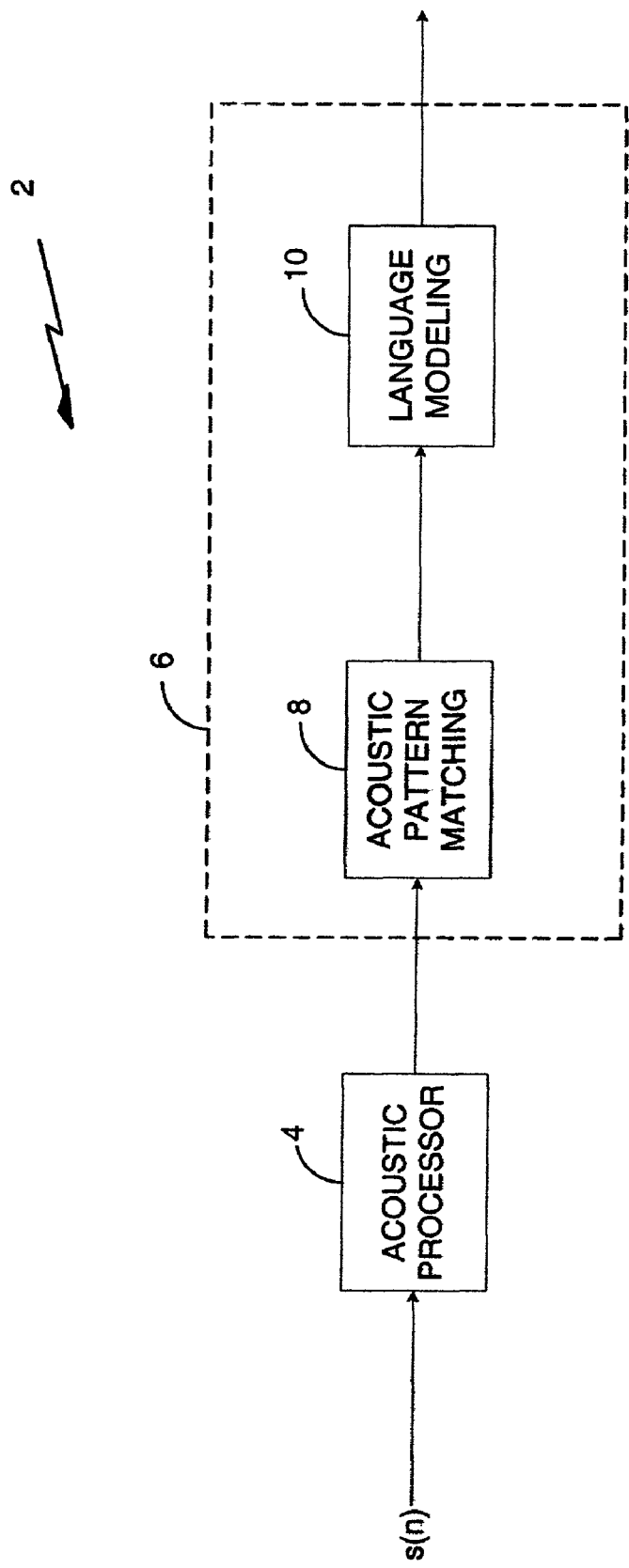
FIG. 1 shows a voice recognition system including an Acoustic Processor and a Word Decoder in accordance with one embodiment.

FIG. 1 shows a voice recognition system 2 including an Acoustic Processor 4 and a Word Decoder 6 in accordance with one embodiment. The Word Decoder 6 comprises an Acoustic Pattern Matching element 8 and a Language Modeling element 10. The Language Modeling element 10 is also called a grammar specification element. The Acoustic Processor 4 is coupled to the Acoustic Matching element 8 of the Word Decoder 6. The Acoustic Pattern Matching element 8 is coupled to a Language Modeling element 10.

The Acoustic Processor 4 extracts features from an input speech signal and provides those features to the Word Decoder 6. Generally speaking, the Word Decoder 6 translates the acoustic features from the Acoustic Processor 4 into an estimate of the speaker's original word string. This is accomplished in two steps: acoustic pattern matching and language modeling. Language modeling can be avoided in applications of isolated word recognition. The Acoustic Pattern Matching element 8 detects and classifies possible acoustic patterns, such as phonemes, syllables, words, etc. The candidate patterns are provided to Language Modeling element 10, which models the rules of syntactic constraints that determine what sequences of words are grammatically well formed and meaningful. Syntactic information can be a valuable guide to voice recognition when acoustic information alone is ambiguous. Based on language modeling, the VR sequentially interprets the acoustic feature matching results and provides the estimated word string.

Both the acoustic pattern matching and language modeling in the Word Decoder 6 require a mathematical model, either deterministic or stochastic, to describe the speaker's phonological and acoustic-phonetic variations. The performance of a speech recognition system is directly related to the quality of these two models. Among the various classes of models for acoustic pattern matching, template-based dynamic time warping (DTW) and stochastic hidden Markov modeling (HMM) are the two most commonly used models, which are both known to those skilled in the art.

The Acoustic Processor 4 represents a front-end speech analysis subsystem in the voice recognizer 2. In response to an input speech signal, it provides an appropriate representation to characterize the time-varying speech signal. It should discard irrelevant information such as background noise, channel distortion, speaker characteristics and manner of speaking. An efficient acoustic feature will furnish voice recognizers with higher acoustic discrimination power. The most useful characteristic is the short time spectral envelope. In characterizing the short time spectral envelope, a commonly used spectral analysis technique is filter-bank based spectral analysis.

Combining multiple VR systems (also called VR engines) provides enhanced accuracy and uses a greater amount of information in the input speech signal than a single VR system. A system and method for combining VR engines is described in U.S. patent application Ser. No. 09/618,177, entitled "Combined Engine System and Method for Voice Recognition", filed Jul. 18, 2000, and U.S. patent application Ser. No. 09/657,760, entitled "System and Method for Automatic Voice Recognition Using Mapping," filed Sep. 8, 2000, which are assigned to the assignee of the present invention and fully incorporated herein by reference.

In one embodiment, multiple VR engines are combined in a Distributed VR system. Thus, there is a VR engine on both the subscriber unit and a network server. The VR engine on the subscriber unit is a local VR engine. The VR engine on the server is a network VR engine. The local VR engine comprises a processor for executing the local VR engine and a memory for storing speech information. The network VR engine comprises a processor for executing the network VR engine and a memory for storing speech information.

An exemplary DVR system is disclosed in U.S. patent application Ser. No. 09/755,651, entitled "System And Method For Improving Voice Recognition In A Distributed Voice Recognition System," filed Jan. 5, 2001, assigned to the assignee of the present invention and incorporated by reference herein.

Figure 2:
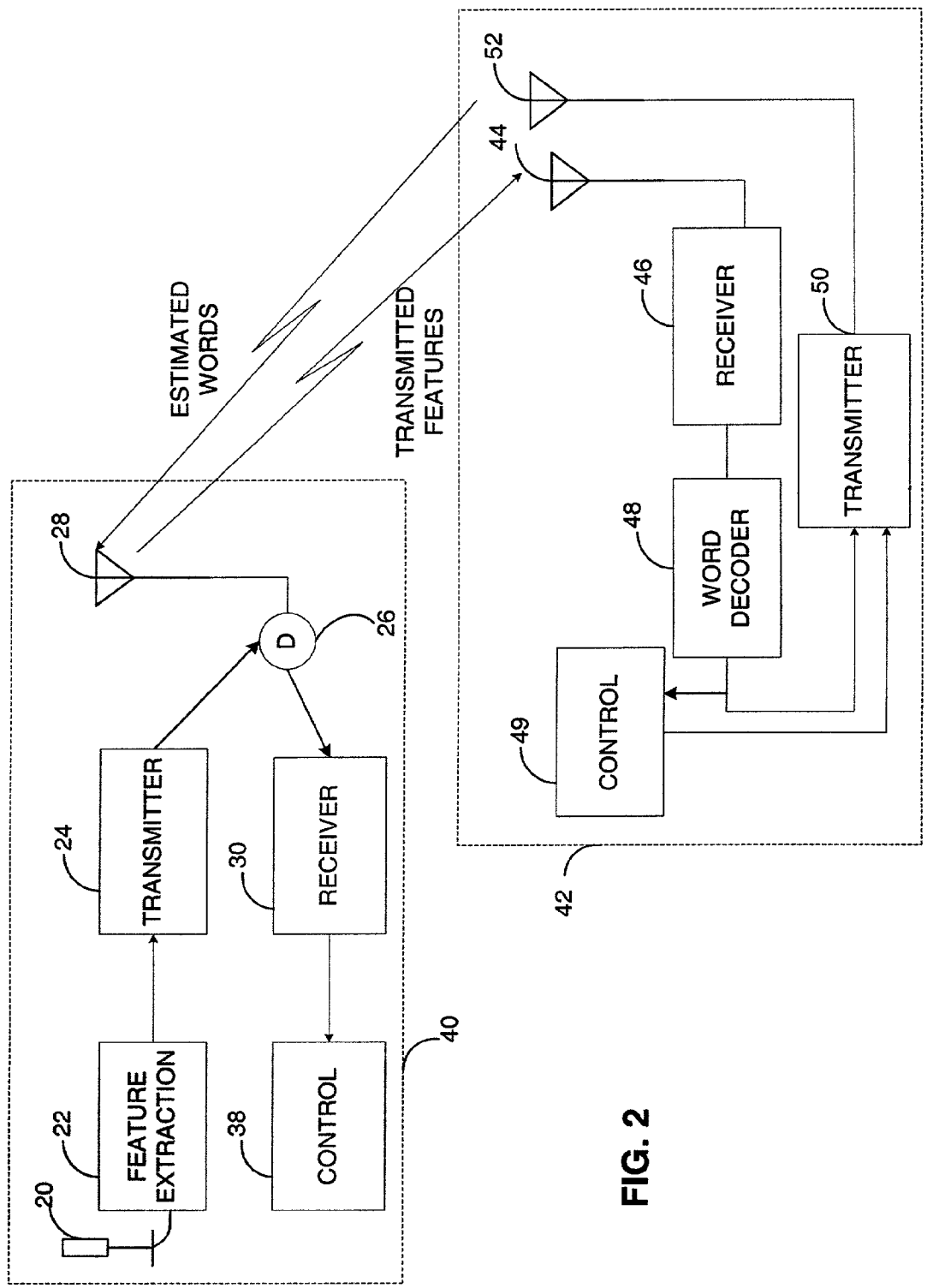
FIG. 2 shows an exemplary embodiment of a distributed voice recognition system.

FIG. 2 shows an exemplary embodiment of the present invention. In the exemplary embodiment, the environment is a wireless communication system comprising a subscriber unit 40 and a central communications center referred to as a cell base station 42. In the exemplary embodiment the distributed VR system is presented. In the distributed VR, the acoustic processor or feature extraction element 22 resides in subscriber unit 40 and word decoder 48 resides in the central communications center. If, instead of distributed VR, VR is implemented solely in a subscriber unit, voice recognition would be highly infeasible even for a medium size vocabulary because word recognition has a high computation cost. On the other hand, if VR resides solely at the base station, the accuracy can be decreased dramatically due to the degradation of speech signals associated with speech codec and channel effects. Evidently, there are advantages to the distributed system design. The first is the reduction in cost of a subscriber unit because word decoder hardware would no longer be resident in the subscriber unit 40. The second is a reduction of the drain on the battery (not shown) of subscriber unit 40 that would result from locally performing the computationally intensive word decoder operation. The third is the expected improvement in recognition accuracy in addition to the flexibility and extendibility of the distributed system.

The speech is provided to microphone 20, which converts the speech signal into electrical signals, which are provided to feature extraction element 22. The signals from microphone 20 may be analog or digital. If the signals are analog, then an analog to digital converter (not shown) may be interposed between microphone 20 and feature extraction element 22. The speech signals are provided to feature extraction element 22. Feature extraction element 22 extracts relevant characteristics of the input speech that will be used to decode the linguistic interpretation of the input speech. One example of characteristics that can be used to estimate speech is the frequency characteristics an input speech frame. This is frequently provided as linear predictive coding parameters of the input frame of speech. The extracted features of the speech are then provided to transmitter 24 which codes, modulates and amplifies the extracted feature signal and provides the features through duplexer 26 to antenna 28, where the speech features are transmitted to cellular base station or central communications center 42. Various types of digital coding, modulation, and transmission schemes well known in the art may be employed.

At central communications center 42, the transmitted features are received at antenna 44 and provided to receiver 46. Receiver 46 may perform the functions of demodulating and decoding the received transmitted features which it provides to word decoder 48. Word decoder 48 determines, from the speech features, a linguistic estimate of the speech and provides an action signal to transmitter 50. Transmitter 50 performs the functions of amplification, modulation and coding of the action signal, and provides the amplified signal to antenna 52, which transmits the estimated words or a command signal to portable phone 40. Transmitter 50 may also employ digital coding, modulation or transmission techniques known in the art.

At subscriber unit 40, the estimated words or command signals are received at antenna 28, which provides the received signal through duplexer 26 to receiver 30 which demodulates, decodes the signal and then provides the command signal or estimated words to control element 38. In response to the received command signal or estimated words, control element 38 provides the intended response (e.g., dialing a phone number, providing information to display screen on the portable phone, etc.).

In one embodiment, the information sent back from central communications center 42 need not be an interpretation of the transmitted speech, rather the information sent back from central communications center 42 may be a response to the decoded message sent by the portable phone. For example, one may inquire of messages on a remote answering machine (not shown) coupled via a communications network to central communications center 42, in which case the signal transmitted from central communications center 42 to subscriber unit 40 may be the messages from the answering machine in this implementation. A second control element 49 would be collocated in the central communications center.

A VR engine obtains speech data in the form of Pulse Code Modulation (PCM) signals. The VR engine processes the signal until a valid recognition is made or the user has stopped speaking and all speech has been processed. In one embodiment, an DVR architecture includes a local VR engine that obtains PCM data and generates front-end information. In one embodiment, the front-end information is cepstral parameters. In another embodiment, the front-end information can be any type of information/features that characterizes the input speech signal. It would be understood by those skilled in the art that any type of features known to one skilled in the art might be used to characterize the input speech signal.

For a typical recognition task, the local VR engine obtains a set of trained templates from its memory. The local VR engine obtains a grammar specification from an application. An application is service logic that enables users to accomplish a task using the subscriber unit. This logic is executed by a processor on the subscriber unit. It is a component of a user interface module in the subscriber unit.

A system and method for improving storage of templates in a voice recognition system is described in U.S. patent application Ser. No. 09/760,076, entitled "System And Method For Efficient Storage Of Voice Recognition Models", filed Jan. 12, 2001, which is assigned to the assignee of the present invention and fully incorporated herein by reference. A system and method for improving voice recognition in noisy environments and frequency mismatch conditions and improving storage of templates is described in U.S. patent application Ser. No. 09/703,191, entitled "System and Method for Improving Voice Recognition In Noisy Environments and Frequency Mismatch Conditions", filed Oct. 30, 2000, which is assigned to the assignee of the present invention and fully incorporated herein by reference.

A grammar specifies the active vocabulary using sub-word models. Typical grammars include 7-digit phone numbers, dollar amounts, and a name of a city from a set of names. Typical grammar specifications include an "Out of Vocabulary (OOV)" condition to represent the condition where a confident recognition decision could not be made based on the input speech signal.

In one embodiment, the local VR engine generates a recognition hypothesis locally if it can handle the VR task specified by the grammar. The local VR engine transmits front-end data to the VR server when the grammar specified is too complex to be processed by the local VR engine.

A forward link refers to transmission from the network server to a subscriber unit and a reverse link refers to transmission from the subscriber unit to the network server. Transmission time is partitioned into time units. In one embodiment, the transmission time may be partitioned into frames. In another embodiment, the transmission time may be partitioned into time slots. In accordance with one embodiment, data is partitioned into data packets, with each data packet being transmitted over one or more time units. At each time unit, the base station can direct data transmission to any subscriber unit, which is in communication with the base station. In one embodiment, frames may be further partitioned into a plurality of time slots. In yet another embodiment, time slots may be further partitioned. For example, a time slot may be partitioned into half-slots and quarter-slots.

Figure 3:
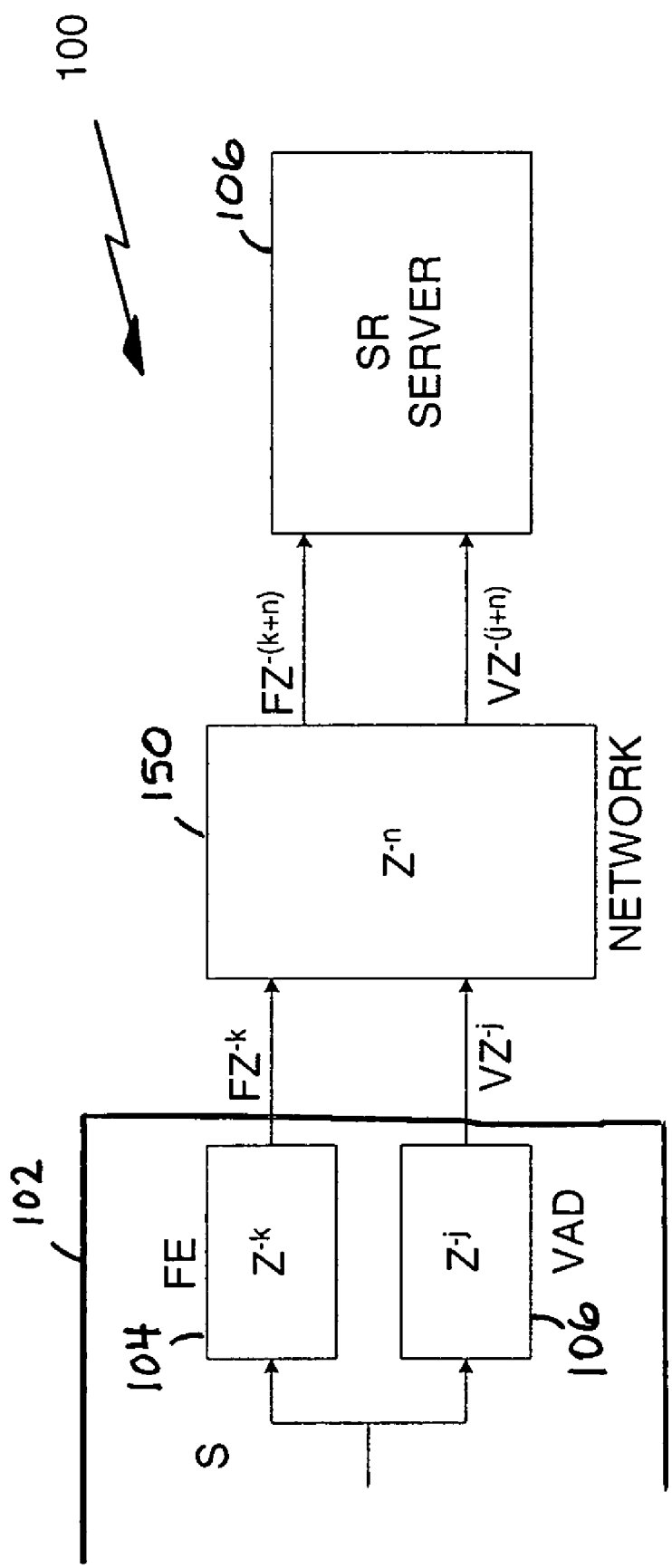
FIG. 3 illustrates delays in an exemplary embodiment of a distributed voice recognition system.

FIG. 3 illustrates delays in an exemplary embodiment of a distributed voice recognition system 100. The DVR system 100 comprises a subscriber unit 102, a network 150, and a speech recognition (SR) server 160. The subscriber unit 102 is coupled to the network 150 and the network 150 is coupled to the SR server 160. The front-end of the DVR system 100 is the subscriber unit 102, which comprises a feature extraction (FE) module 104 and a voice activity detection (VAD) module 106. The FE performs feature extraction from a speech signal and compression of resulting features. In one embodiment, the VAD module 106 determines which frames will be transmitted from a subscriber unit to an SR server. The VAD module 106 divides the input speech into segments comprising frames where speech is detected and the adjacent frames before and after the frame with detected speech. In one embodiment, an end of each segment (EOS) is marked in a payload by sending a null frame.

The VR frontend performs frontend processing in order to characterize a speech segment. Vector s is a speech signal and vector F and vector V are FE and VAD vectors, respectively. In one embodiment, the VAD vector is a one element long and the one element contains a binary value. In another embodiment, the VAD vector is a binary value concatenated with additional features. In one embodiment, the additional features are band energies to enable fine end-pointing by the server. End-pointing is the demarcation of a speech signal into silence and speech segments. Thus, the server can use additional computational resources to arrive at a more reliable VAD decision Band energies correspond to bark amplitudes. The Bark scale is a warped frequency scale of critical bands corresponding to human perception of hearing. Bark amplitude calculation is known in the art and described in Lawrence Rabiner & Biing-Hwang Juang, Fundamentals of Speech Recognition (1993), which is fully incorporated herein by reference. In one embodiment, digitized PCM speech signals are converted to band energies.

FIG. 3 illustrates delays in an exemplary embodiment of a distributed voice recognition system. The delays in computing vectors F and V and transmitting them over the network are shown using Z transform notation. The algorithm latency introduced in computing vector F is k, and in one embodiment, the range of k is from 100 to 300 msec. Similarly, the algorithm latency for computing VAD information is j and in one embodiment, the range of j is from 10 to 100 msec. Thus, FE feature vectors are available with a delay of k units and VAD information is available with a delay of j units. The delay introduced in transmitting the information over the network is n units. The network delay is the same for both vectors F and V.

Figure 4:
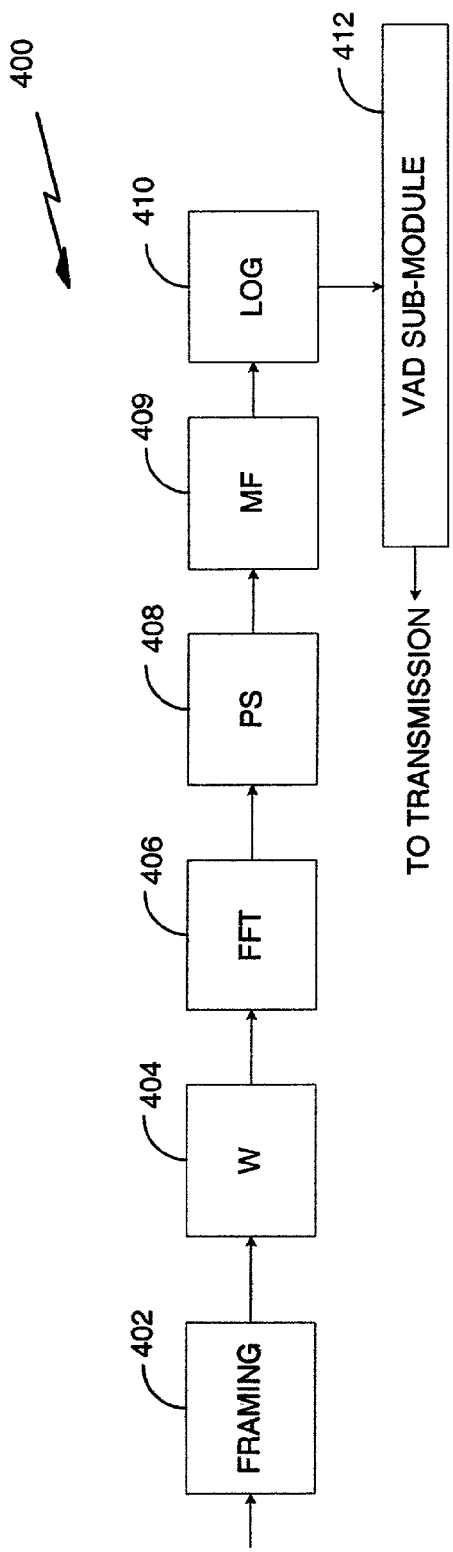
FIG. 4 shows a block diagram of a VAD module in accordance with one embodiment.

FIG. 4 shows a block diagram of the VAD module 400. The framing module 402 includes an analog-to-digital converter (not shown). In one embodiment, the output speech sampling rate of the analog-to-digital converter is 8 kHz. It would also be understood by those skilled in the art that other output sampling rates can be used. The speech samples are divided into overlapping frames. In one embodiment, the frame length is 25 ms (200 samples) and the frame rate is 10 ms (80 samples).

In one embodiment, each frame is windowed by a windowing module 404 using a Hamming window function. A fast Fourier transform (FFT) module 406 computes a magnitude spectrum for each windowed frame. In one embodiment, a fast Fourier transform of length 256 is used to compute the magnitude spectrum for each windowed frame. In one embodiment, the first 129 bins from the magnitude spectrum are retained for further processing. The power spectrum (PS) module 408 computes a power spectrum by taking the square of the magnitude spectrum.

In one embodiment, a Mel-filtering module 409 computes a MEL-warped spectrum using a complete frequency range (0-4000 Hz). This band is divided into 23 channels equidistant in MEL frequency scale. Thus, there are 23 energy values per frame. The output of the Mel-filtering module 409 is the weighted sum of FFT power spectrum values in each band. The output of the Mel-filtering module 409 is passed through a logarithm module 410 that does non-linear transformation of the Mel-filtering output. In one embodiment, the non-linear transformation is a natural logarithm. It would be understood by those skilled in the art that other non-linear transformations could be used.

A Voice Activity Detector (VAD) sub-module 412 takes as input the transformed output of the logarithm module 409 and discriminates between speech and non-speech frames. The VAD sub-module 412 detects the presence of voice activity within a frame. The VAD sub-module 412 determines whether a frame has voice activity or has no voice activity. In one embodiment, the VAD sub-module 412 is a three layer Feed-Forward Neural Net.

Figure 5:
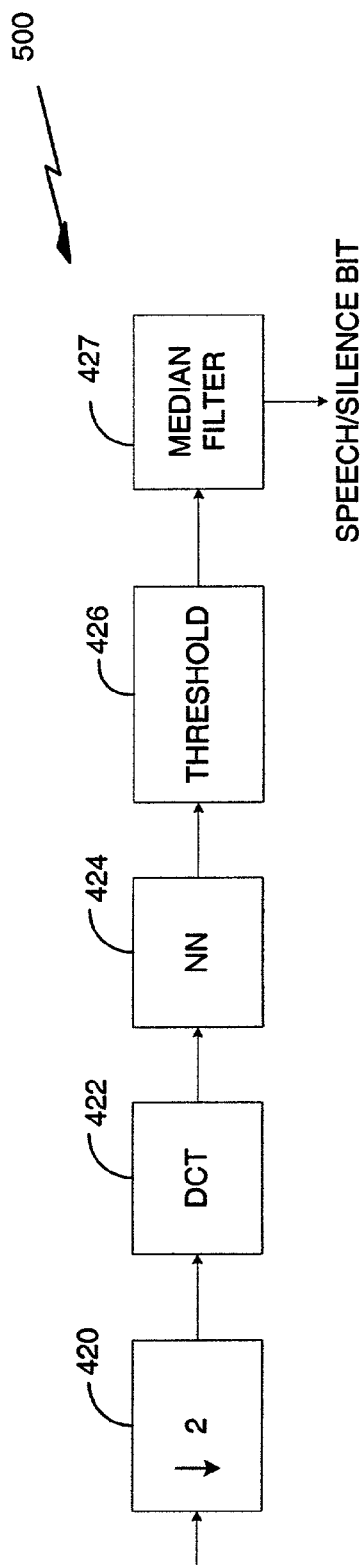
FIG. 5 shows a block diagram of a VAD sub-module in accordance with one embodiment.

FIG. 5 shows a block diagram of a VAD sub-module 500. In one embodiment, a downsample module 420 downsamples the output of the logarithm module by a factor of two.

A Discrete Cosine Transform (DCT) module 422 calculates cepstral coefficients from the downsampled 23 logarithmic energies on the MEL scale. In one embodiment, the DCT module 422 calculates 15 cepstral coefficients.

A neural net (NN) module 424 provides an estimate of the posterior probability of the current frame being speech or non-speech. A threshold module 426 applies a threshold to the estimate from the NN module 424 in order to convert the estimate to a binary feature. In one embodiment, a threshold of 0.5 is used.

A Median Filter module 427 smoothes the binary feature. In one embodiment, the binary feature is smoothed using an 11-point median filter. In one embodiment, the Median Filter module 427 removes any short pauses or short bursts of speech of duration less than 40 ms. In one embodiment, the Median Filter module 427 also adds seven frames before and after the transition from silence to speech. In one embodiment, a bit set according to whether a frame is determined to be speech activity or silence.

Figure 6:
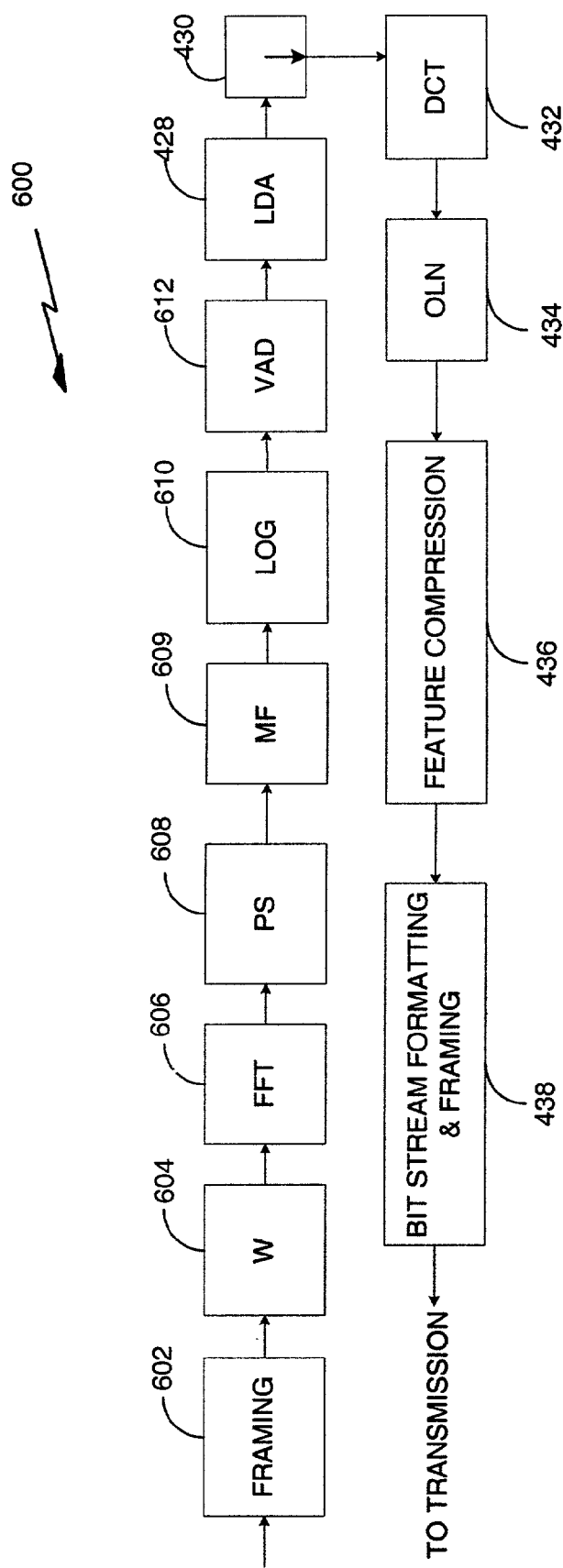
FIG. 6 shows a block diagram of an FE module in accordance with one embodiment.

FIG. 6 shows a block diagram of the FE module 600. A framing module 602, windowing module 604, FFT module 606, PS module 608, MF module 609, and a logarithm module 610, are also part of the FE and serve the same functions in the FE module 600 as they do in the VAD module 400. In one embodiment, these common modules are shared between the VAD module 400 and the FE module 600.

A VAD sub-module 612 is coupled to the logarithm module 610. A Linear Discriminant Analysis (LDA) module 428 is coupled to the VAD sub-module 612 and applies a bandpass filter to the output of the VAD sub-module 610. In one embodiment, the bandpass filter is a RASTA filter. An exemplary bandpass filter that can be used in the VR frontend are the RASTA filters described in U.S. Pat. No. 5,450,522 entitled, "Auditory Model for Parametrization of Speech" filed Sep. 12, 1995, which is incorporated by reference herein.

A downsample module 430 downsamples the output of the LDA module. In one embodiment, a downsample module 430 downsamples the output of the LDA module by a factor of two.

A Discrete Cosine Transform (DCT) module 432 calculates cepstral coefficients from the downsampled 23 logarithmic energies on the MEL scale. In one embodiment, the DCT module 422 calculates 15 cepstral coefficients.

In order to compensate for the noises, an online normalization (OLN) module 434 applies a mean and variance normalization to the cepstral coefficients from the DCT module 432. The estimates of the local mean and variance are updated for each frame. In one embodiment, an experimentally determined bias is added to the estimates of the variance before normalizing the features. The bias eliminates the effects of small noisy estimates of the variance in the long silence regions. Dynamic features are derived from the normalized static features. It not only saves computation required for normalization but also provides better recognition performance.

A feature compression module 436 compresses the feature vectors. A bit stream formatting & framing module 438 performs bit-stream formatting of the compressed feature vectors, thereby readying them for transmission. In one embodiment, the feature compression module 436 performs error protection of the formatted bit stream.

The FE module 600 concatenates vector F $Z^{-k}$ and vector V $Z^{-j}$. Thus, each FE feature vector is comprised of a concatenation of vector F $Z^{-k}$ and vector V $Z^{-j}$.

In the present invention, VAD output is transmitted ahead of a payload, which reduces a DVR system's overall latency since the front-end processing of the VAD is shorter (j<k) than the front-end processing of the FE.

In one embodiment, an application running on the server can determine the end of a user's utterance when vector V indicates silence for more than an $S_{hangover}$ period of time. $S_{hangover}$ is the amount of silence duration following active speech for utterance capture to be complete. $S_{hangover}$ has to be greater than an embedded silence allowed in an utterance. If $S_{hangover}$>k, FE algorithm latency will not increase the response time. In one embodiment, FE features corresponding to time t-k and VAD features corresponding to time t-j are combined to form extended FE features. VAD output is transmitted when available and does not depend on when the FE output is available for transmission. Both the VAD output and the FE output are synchronized with the transmission payload. In one embodiment, Information corresponding to each segment of speech is transmitted, i.e. no frame dropping.

In another embodiment, channel bandwidth is reduced during silence periods. Vector F is quantized with a lower bit rate when vector V indicates silence regions. This is similar to variable rate and multi-rate vocoders where a bit rate is changed based on voice activity detection. Both the VAD output and the FE output are synchronized with the transmission payload. Information corresponding to each segment of speech is transmitted. Thus, VAD output is transmitted, but the bit rate is reduced on frames with silence.

In yet another embodiment, only speech frames are transmitted to the server. Thus, frames with silence are dropped completely. Since only speech frames are transmitted to the server, the server needs a way to determine that the user has finished speaking. This is irrespective of the value of latencies k, j and n. Consider a multi-word like "Portland <PAUSE> Maine" or "617-555-<PAUSE> 1212". A separate channel is used to transmit VAD information. FE features corresponding to the <PAUSE> region are dropped at the subscriber unit and the server would have no information to deduce that user has finished speaking without the separate channel. This embodiment has a separate channel for transmitting VAD information.

Figure 7:
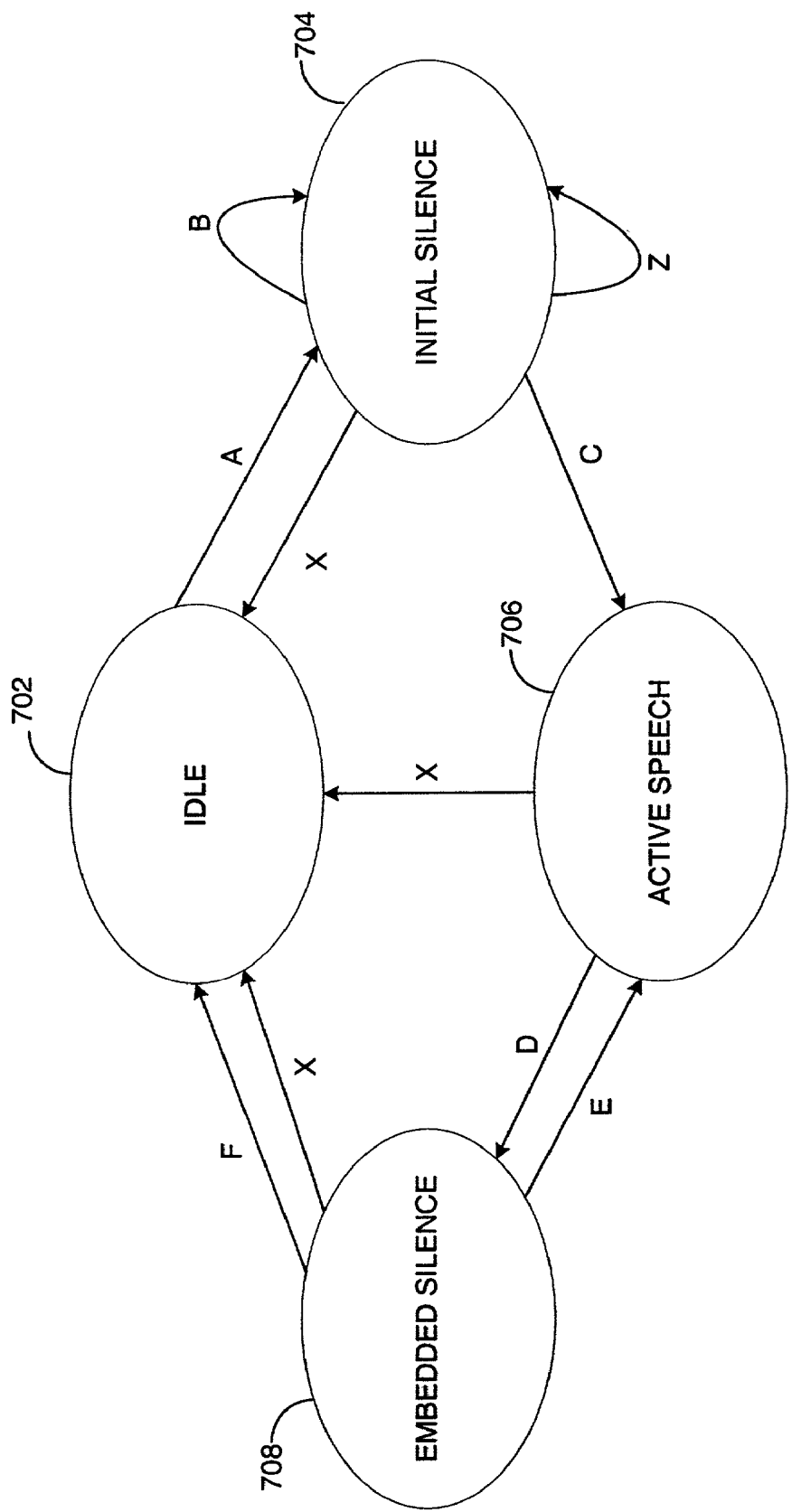
FIG. 7 shows a VAD module state diagram in accordance with one embodiment.

In another embodiment, the status of a recognizer is maintained even when there are long pauses in the user's speech as per the state diagram in FIG. 7 and the events and actions in table 1. When speech activity is detected, an average vector of the FE module 600 corresponding to the frames dropped and the total number of frames dropped is transmitted prior to transmitting speech frames. In addition, when the mobile detects that $S_{hangover}$ frames of silence have been observed, an end of user's utterance is detected. In one embodiment, the speech frames and the total number of frames dropped are transmitted to the server along with the average vector of the FE module 600 on the same channel. Thus, the payload includes both features and VAD output. In one embodiment, the VAD output is sent last in the payload to indicate end of speech.

For a typical utterance, the VAD module 400 will start in Idle state 702 and go to Initial Silence state 704 due to event A. There could be a few B events, which leave the module in Initial Silence state. When speech is detected, event C causes a transition to Active Speech state 706. The module then toggles between Active Speech 706 and Embedded Silence states 708 with events D and E. When the embedded silence is longer than $S_{hangover}$, an end of utterance is detected and event F causes a transition to Idle state 702. Event Z represents a long initial silence in an utterance. It facilitates a TIME_OUT error condition when a user's speech is not detected. Event X aborts a given state and returns the module to the Idle state 702. This can be a user or a system initiated event.

FIG. 8 shows parts of speech and VAD events on a timeline. Referring to FIG. 8, pane 4, and table 2, the events causing state transitions are shown with respect to the VAD module 400.

TABLE 1

| Event | Action |
|---|---|
| A | User initiated utterance capture. |
| B | $S_{active} < S_{min}$. Active Speech duration is less than minimum utterance duration. Prevent false detection due to clicks and other extraneous noises. |
| C | $S_{active} > S_{min}$. Initial speech found. Send average FE feature vector, FDcount, $S_{before}$ frames. Start sending FE feature vectors. |
| D | $S_{sil} > S_{after}$. Send $S_{after}$ frames. Reset $FD_{count}$ to zero. |
| E | $S_{active} > S_{min}$. Active speech found after an embedded silence. Send average FE feature vector, $FD_{count}$, $S_{before}$ frames. Start sending FE feature vectors. |
| F | $S_{sil} > S_{hangover}$. End of user's speech is detected. Send average FE feature vector and $FD_{count}$. |

TABLE 1-continued

Event Action

X   User initiated abort. Can be user initiated from the keypad, server initiated when recognition is complete or a higher priority interrupt in the device.

Z   $S_{sil}$ > MAXSILDURATION. MAXSILDURATION <2.5 seconds for 8 bit FDCounter. Send average FE feature vector and $FD_{count}$. Reset FDcount to zero.

In table 1, $S_{before}$ and $S_{after}$ are the number of silence frames transmitted to the server before and after active speech.

From the state diagram and the table of events that show the corresponding actions on the mobile, it is clear that there are some thresholds used in initiating state transitions. It is possible to use certain default values for these thresholds. However, it would be understood by those skilled in the art that other values for the thresholds shown in table 1 may be used.

In addition, the server can modify the default values depending on the application. The default values are programmable as identified in table 2.

TABLE 2

| Segment Name | Coordinates in FIG. 8. | Description |
| --- | --- | --- |
| $S_{min}$ | >(b-a) | Minimum Utterance Duration in frames. Used to prevent false detection of clicks and noises as active speech. |
| $S_{active}$ | (e-d) and (i-h) | Duration of an active speech segment in frames, as detected by the VAD module. |
| $S_{before}$ | (d-c) and (h-g) | Number of frames to be transmitted before active speech, as detected by the VAD. Amount of silence region to be transmitted preceding active speech. |
| $S_{after}$ | (f-e) and (j-i) | Number of frames to be transmitted after active speech, as detected by the VAD. Amount of silence region to be transmitted following active speech. |
| $S_{sil}$ | (d-0), (h-e), (k-i) | Duration of current silence segment in frames, as detected by VAD. |
| $S_{embedded}$ | >(h-e) | Duration of silence in frames ($S_{sil}$) between two active speech segments. |
| $FD_{count}$ | — | Number of silence frames dropped prior to the current active speech segment. |
| $S_{hangover}$ | <(k-i) >(h-e) | Duration of silence in frames ($S_{sil}$) after the last active speech segments for utterance capture to be complete. $S_{hangover}$ >= $S_{embedded}$. |
| $S_{maxsil}$ |  | Maximum silence duration in which the mobile drops frames. If the maximum silence duration is exceeded, then the mobile sends an average FE feature vector and resets the counter to zero. This is useful for keeping the recognition state on the server active. |
| $S_{minsil}$ |  | Minimum silence duration expected before and after active speech. If less than $S_{minsil}$ is observed prior to active speech, the server may decide not to perform certain adaptation tasks using the data. This is sometimes called a Spoke_Too_Soon error. Note that the server can deduce this condition from the $FD_{count}$ value. A separate variable may not be needed. |

In one embodiment, the minimum utterance duration $S_{min}$ is around 100 msec. In one embodiment, the amount of silence region to be transmitted preceding active speech. $S_{before}$ is around 200 msec. In one embodiment, $S_{after}$, the amount of silence region to be transmitted following active speech is around 200 msec. In one embodiment, the amount of silence duration following active speech for utterance capture to be complete $S_{hangover}$ is between 500 msec to 1500 msec., depending on the VR application. In one embodiment, An eight bit counter enables 2.5 seconds of $S_{maxsil}$ at 100 frames per second. In one embodiment, minimum silence duration expected before and after active speech $S_{minsil}$ is around 200 msec.

Thus, a novel and improved method and apparatus for voice recognition has been described. Those of skill in the art would understand that the various illustrative logical blocks, modules, and mapping described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, and mapping described in connection with the embodiments disclosed herein may be implemented or performed with a processor executing a set of firmware instructions, an application specific integrated circuit (ASIC), a field programmable gate array (FPGA) or other programmable logic device, discrete gate or transistor logic, discrete hardware components such as, e.g., registers, any conventional programmable software module and a processor, or any combination thereof designed to perform the functions described herein. The VAD module 400 and the FE module 600 may advantageously be executed in a microprocessor, but in the alternative, the VAD module 400 and the FE module 600 may be executed in any conventional processor, controller, microcontroller, or state machine. The templates could reside in RAM memory, flash memory, ROM memory, EPROM memory, EEPROM memory, registers, hard disk, a removable disk, a CD-ROM, or any other form of storage medium known in the art. The memory (not shown) may be integral to any aforementioned processor (not shown). A processor (not shown) and memory (not shown) may reside in an ASIC (not shown). The ASIC may reside in a telephone.

The previous description of the embodiments of the invention is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A subscriber unit comprising:
a feature extraction module configured to extract a plurality of features of a speech signal, the plurality of features being used for voice recognition;
a voice activity detection (VAD) module configured to detect voice activity within the speech signal, to divide the speech signal into speech frames and non-speech frames, wherein speech is detected in the speech frames and speech is not detected in the non-speech frames, to provide VAD information comprising an indication of detected voice activity, and to generate output including the speech frames and excluding the non-speech frames; and
a wireless transmitter coupled to the voice activity detection module and configured to transmit the VAD information comprising the indication of detected voice activity and the output that includes the speech frames and excludes the non-speech frames over a wireless network to a voice recognition device in a distributed voice recognition system, wherein the VAD information is transmitted over a separate channel than the output to identify the non-speech frames that were excluded from the output.

2. The subscriber unit of claim 1, wherein the voice activity detection module is configured to declare an end of the detected voice activity when a silence duration exceeds a predetermined period of time.

3. The subscriber unit of claim 1, wherein the plurality of features are based on frequency characteristics of the speech signal.

4. The subscriber unit of claim 1, wherein the wireless transmitter transmits the output at a lower bit rate during silence periods than during non-silence periods.

5. The subscriber unit of claim 1, further comprising:
a control module configured to receive from the voice recognition device in the distributed voice recognition system at least one word or command estimated based on the indication of detected voice activity and the plurality of features.

6. The subscriber unit of claim 5, wherein the control module is further configured to initiate an action at the subscriber unit based on the at least one word or command.

7. The subscriber unit of claim 5, wherein the control module is further configured to initiate dialing of a phone number or displaying of information on a screen in response to the at least one word or command.

8. A subscriber unit comprising:
means for extracting a plurality of features of a speech signal, the plurality of features being used for voice recognition;
means for detecting voice activity within the speech signal, dividing the speech signal into speech frames and non-speech frames, wherein speech is detected in the speech frames and speech is not detected in the non-speech frames, providing an indication of detected voice activity, and generating output including the speech frames and excluding the non-speech frames; and
means for transmitting the indication of detected voice activity and the output that includes the speech frames and excludes the non-speech frames over a wireless network to a voice recognition device in a distributed voice recognition system, wherein the indication of detected voice activity is transmitted over a separate channel than the output to identify the non-speech frames that were excluded from the output.

9. The subscriber unit of claim 8, further comprising:
means for declaring an end of the detected voice activity when a silence duration exceeds a predetermined period of time.

10. The subscriber unit of claim 8, further comprising:
means for determining the plurality of features based on frequency characteristics of the speech signal.

11. The subscriber unit of claim 8, further comprising:
means for sending the output at a lower bit rate during silence periods than during non-silence periods.

12. The subscriber unit of claim 8, further comprising:
means for receiving from the voice recognition device in the distributed voice recognition system at least one word or command estimated based on the indication of detected voice activity and the plurality of features.

13. The subscriber unit of claim 12, further comprising:
means for initiating an action at the subscriber unit based on the at least one word or command.

14. The subscriber unit of claim 12, further comprising:
means for initiating dialing of a phone number or displaying of information on a screen in response to the at least one word or command.

15. A method comprising:
extracting a plurality of features of a speech signal, the plurality of features being used for voice recognition;
detecting voice activity within the speech signal, dividing the speech signal into speech frames and non-speech frames, wherein speech is detected in the speech frames and speech is not detected in the non-speech frames, providing an indication of detected voice activity, and generating output including the speech frames and excluding the non-speech frames; and
transmitting the indication of detected voice activity and the output that includes the speech frames and excludes the non-speech frames over a wireless network to a voice recognition device in a distributed voice recognition system, wherein the indication of detected voice activity is transmitted over a separate channel than the output to identify the non-speech frames that were excluded from the output.

16. The A method of claim 15, further comprising:
combining the plurality of features and the indication of detected voice activity, thereby creating a combined indication of detected voice activity and features.

17. The method of claim 15, further comprising:
declaring an end of the detected voice activity when a silence duration exceeds a predetermined period of time.

18. The method of claim 15, further comprising:
determining the plurality of features based on frequency characteristics of the speech signal.

19. The method of claim 15, further comprising:
sending the output at a lower bit rate during silence periods than during non-silence periods.

20. The method of claim 15, further comprising:
receiving from the voice recognition device in the distributed voice recognition system at least one word or command estimated based on the indication of detected voice activity and the plurality of features.

21. The method of claim 20, further comprising:
initiating an action at a subscriber unit based on the at least one word or command.

22. The method of claim 20, further comprising:
initiating dialing of a phone number or displaying of information on a screen in response to the at least one word or command.

23. A computer-readable medium storing computer executable instructions that when executed, causes a processor to:
extract a plurality of features of a speech signal, the plurality of features being used for voice recognition;
detect voice activity within the speech signal, divide the speech signal into speech frames and non-speech frames, wherein speech is detected in the speech frames and speech is not detected in the non-speech frames, provide an indication of detected voice activity, and generate output including the speech frames and excluding the non-speech frames; and
transmit the indication of detected voice activity and the output that includes the speech frames and excludes the non-speech frames over a wireless network to a voice recognition device in a distributed voice recognition system, wherein the indication of detected voice activity is transmitted over a separate channel than the output to identify the non-speech frames that were excluded from the output.

24. The computer-readable medium of claim 23, wherein the indication of detected voice activity and the plurality of features are obtained with different processing delays; and wherein the instructions upon execution further cause a processor to
combine the plurality of features and the indication of detected voice activity, thereby creating a combined indication of detected voice activity and features.

25. The computer-readable medium of claim 23, wherein the instructions upon execution further cause a processor to:
declare an end of the detected voice activity when a silence duration exceeds a predetermined period of time.

26. The computer-readable medium of claim 23, wherein the instructions upon execution further cause a processor to:
determine the plurality of features based on frequency characteristics of the speech signal.

27. The computer-readable medium of claim 23, wherein the instructions upon execution further cause a processor to:
transmit the output at a lower bit rate during silence periods than during non-silence periods.

28. The computer-readable medium of claim 23, wherein the instructions upon execution further cause a processor to:
receive from the voice recognition device in the distributed voice recognition system at least one word or command estimated based on the indication of detected voice activity and the plurality of features.

29. The computer-readable medium of claim 28, wherein the instructions upon execution further cause a processor to:
initiate an action at a subscriber unit based on the at least one word or command.

30. The computer-readable medium of claim 28, wherein the instructions upon execution further cause a processor to:
initiate dialing of a phone number or displaying of information on a screen in response to the at least one word or command.

* * * * *